Feb. 1, 1966                M. F. LINDSEY                3,232,100
                            TESTING MACHINE
Filed July 22, 1963                                   3 Sheets-Sheet 1

INVENTOR
MARK F. LINDSEY
BY
Robertson & Smythe
ATTORNEYS

Feb. 1, 1966          M. F. LINDSEY          3,232,100
                      TESTING MACHINE
Filed July 22, 1963                          3 Sheets-Sheet 2

INVENTOR
MARK F. LINDSEY
BY
*Robertson & Smythe*
ATTORNEYS

Feb. 1, 1966 M. F. LINDSEY 3,232,100
TESTING MACHINE
Filed July 22, 1963 3 Sheets-Sheet 3
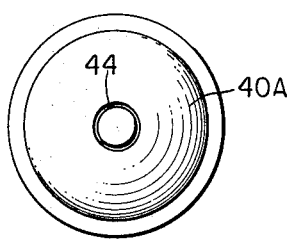
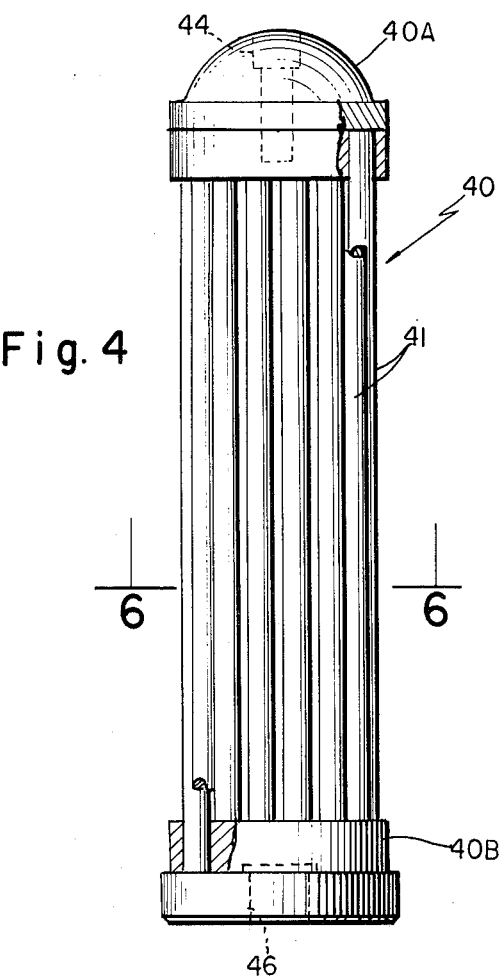
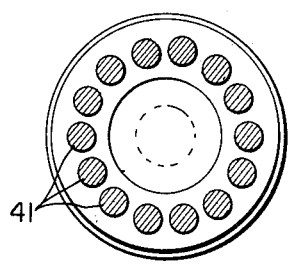
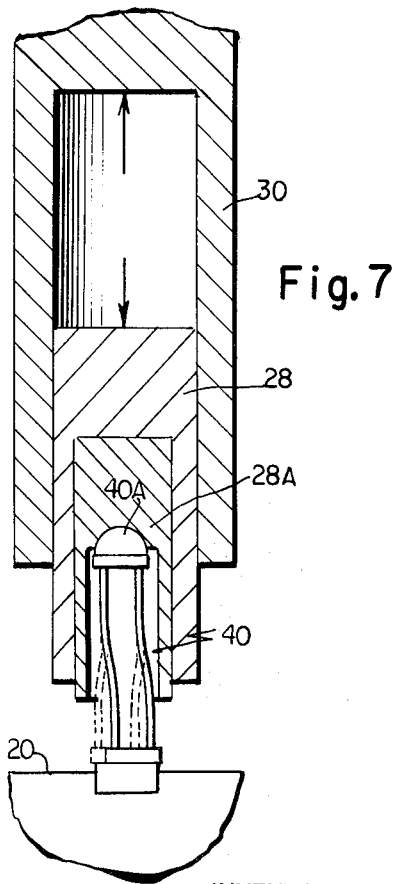
INVENTOR
MARK F. LINDSEY
BY
ATTORNEYS United States Patent Office 3,232,100
Patented Feb. 1, 1966

3,232,100
TESTING MACHINE
Mark F. Lindsey, Port Byron, Ill., assignor to Ametek, Inc., New York, N.Y., a corporation of Delaware
Filed July 22, 1963, Ser. No. 296,765
4 Claims. (Cl. 73—93)

This invention relates in general to a testing machine and, more specifically, it relates to a type of machine which imposes force in the longitudinal direction on a test piece during tension or compression.

In machines of the class described, during the period in which they are imposing a compressive force upon the test piece there may be misalignment between the line of force transmisison and the device in the machine which is causing the compression to be placed on the test piece. The result of this is that there is a lateral force which will tend to cause a binding of the primary force delivery device, be it a hydraulic actuated piston or a screw type. This side force may be so high as to destroy the lubricating film between the piston and the wall or the screw and the thread, thus causing scoring of the metals. Moreover, in such a circumstance, the capacity of the machine to test beyond certain limits is inhibited.

Accordingly, this invention provides a machine arranged to impose stress loadings on a test piece in a longitudinal direction in one of the two states of tension and compression in which there is a primary force delivery device and a test piece gripper between which there is a force transmitting connector. This connector is provided with a plurality of rods, integrally joined to each other at their ends to provide an arrangement which accommodates misalignments in the machine and prevent high lateral forces from being transmitted to the primary force delivering device.

Additionally, the invention provides that the plurality of rods in the connector be arranged in a circular pattern, as a cylinder, in which one of the ends of the connector is hemispherically formed and fits into a mating seat in the machine to accommodate lateral movements of the test piece or the test piece gripper.

Other advantages, objects and features obtained by use of the invention will be apparent from the following description and drawings which are merely exemplary.

In the drawings:

FIGURE 4 is a vertical view of a force transmitting connector removed from the machine of FIGURE 1 and illustrating the invention;

FIGURE 5 is a top view of the connector of FIGURE 4;

FIGURE 6 is a transverse section taken along the line 6—6 of FIGURE 4; and

FIGURE 7 is a semi-schematic view illustrating the operation of the testing machine.

The invention will be described with reference to a hydraulic actuated fatigue testing machine which is arranged to impose stress loadings on test pieces in a longitudinal direction in either varying stages of tension or compression or combinations of both. Such machines are capable of delivering these varying stages in predetermined cycles of any duration or character.

Figure 1:
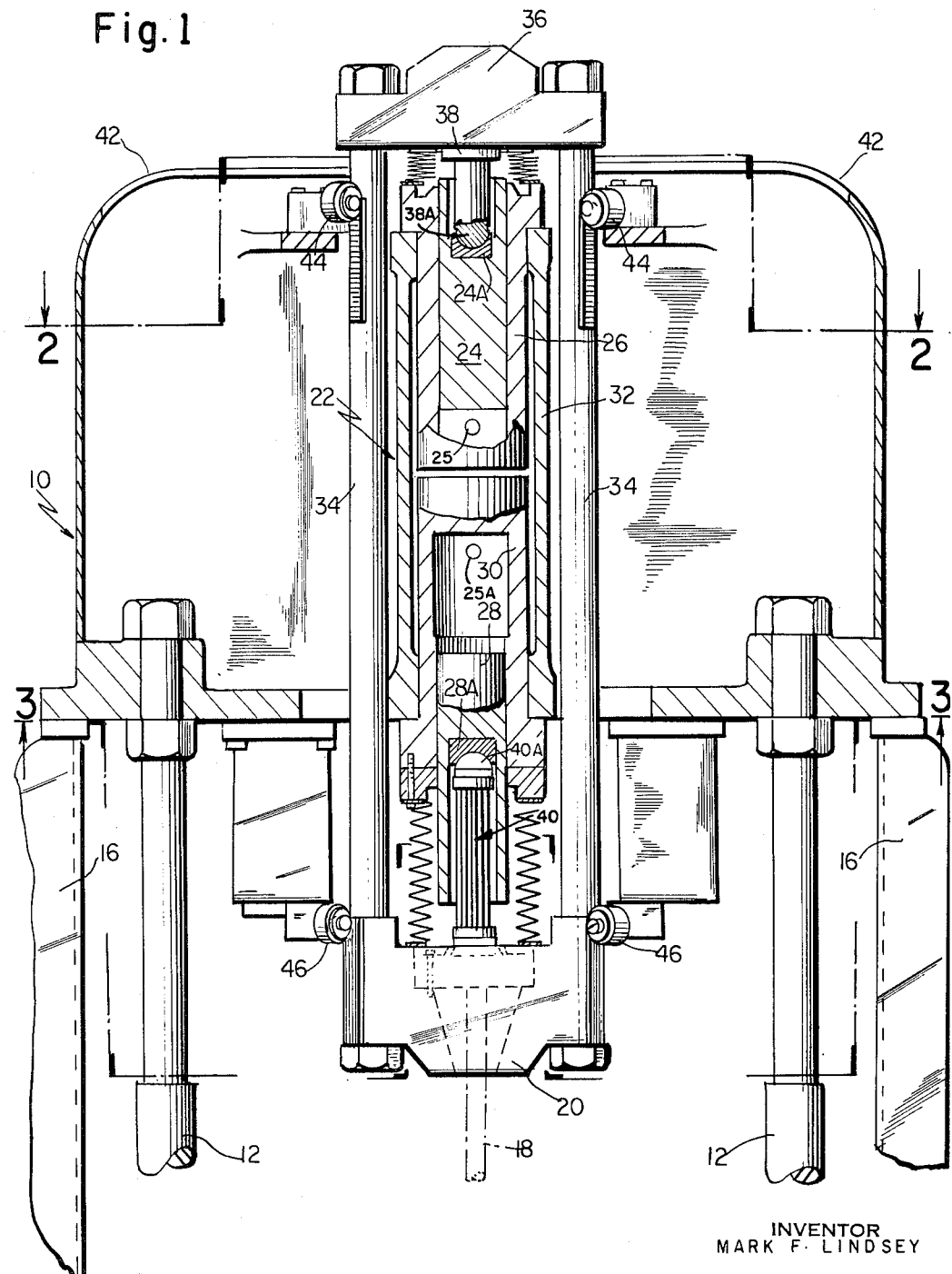
FIGURE 1 is a vertical section of the upper portion of a testing machine utilizing the present invention.
Figure 2:
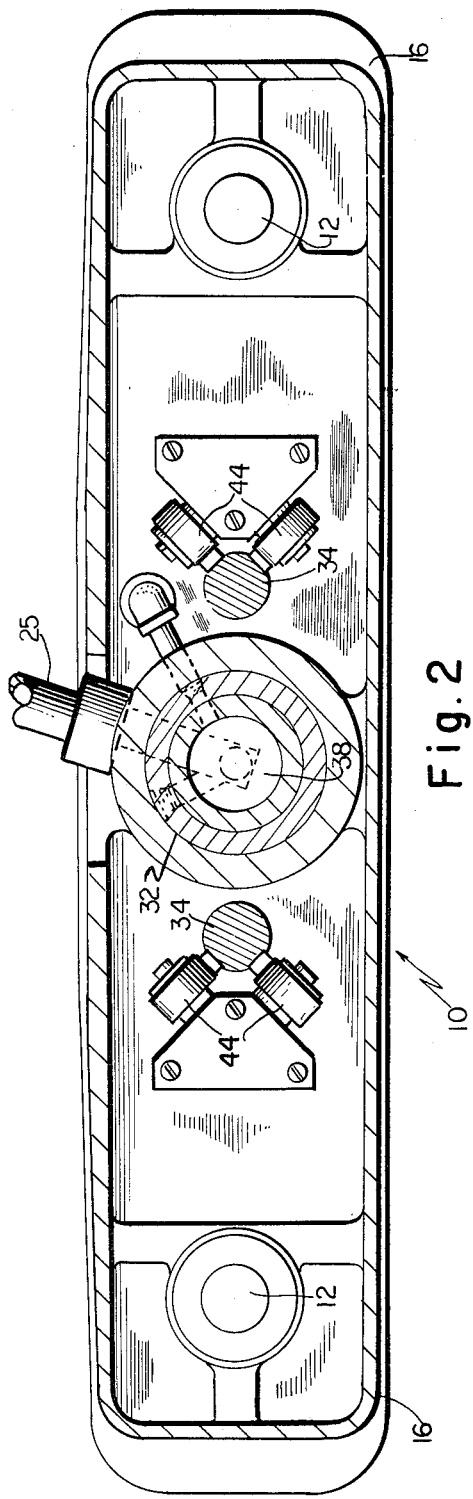
FIGURE 2 is a cross-section taken along the lines 2—2 of FIGURE 1.
Figure 3:
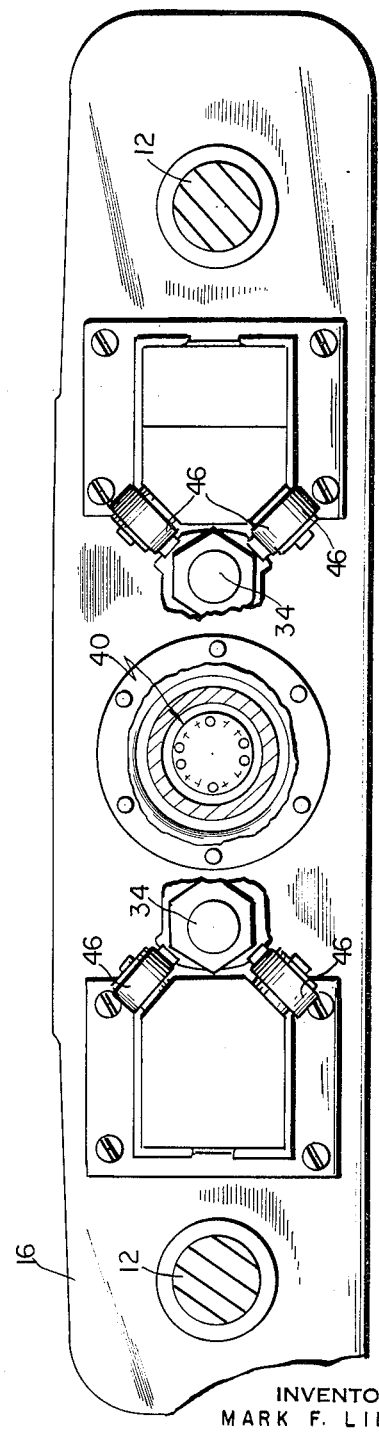
FIGURE 3 is a cross-section taken along the lines 3—3 of FIGURE 1.

FIGURES 1, 2 and 3 show only the upper portions of the machine. A cross head 10 is situated above and supports a base piece (not shown) on two vertically extending heavy rods 12. The base piece is arranged to grip the lower ends of a test specimen and is movable on said rods at predetermined selected positions.

The cross head 10 is principally supported by an outer frame 16 which extends to the bottom portion of the machine and which in turn is set on a floor.

The test specimen 18, shown in phantom, is gripped by a conventional gripping head 20 at its upper end. The gripping head 20 is actuated by a primary force delivery device, generally indicated as 22, which consists of an upper hydraulic ram 24 operating in a cylinder 26 so as to move vertically upward when receiving pressurized hydraulic fluid delivered through a nozzle 25. A lower ram 28, operating within a cylinder 30, is arranged to move vertically downwardly upon the imposition of the hydraulic pressure within the cylinder 30. These two hydraulic operated rams 24 and 28 are mounted within cylinders 26 and 30, which latter are held within a cylinder 32 that is integral with the cross head 10. The nozzle 25 supplies liquid under pressure to cylinder 26, and port 25A supplies liquid under pressure to cylinder 30. Both of these sources can be cut off, or variably opened, to provide varying conditions for testing work in tension, compression or a combination of both.

Outwardly from the cylinder 32 there is a pair of vertically arranged rods 34 which are fixed into the gripping head 20 at their base and tied to a small cross head 36 at their top. The cross head 36 is actuated by the vertically upward force of the tension ram 24 to thus tend to impose an upward movement of the gripper head 20 and place the test specimen 18 in tension. The ram 24 being a primary force delivery device transmits its pressure to the cross head 36 through a connector 38, such connector having a hemispherical end portion 38A and fitting into a mating socket 24A, the purpose of which will be described in more complete detail hereinafter.

The lower compression piston 28 is arranged to transmit its downward force to the gripper 20 through a force transmitting connector 40 to the upper end of the connector 40 which has a hemispherical shape 40A fitting into a similarly and matingly shaped seat or socket 28A. The lower end of the connector 40 is attached by conventional means to the gripper 20.

In order to maintain alignment among gripper 20, rams 28, 24 and their associated cylinders 30 and 26, the main frame 16 has a head cover 42 from which, at the top thereof, there is suspended guide rollers 44 in which there is a pair arranged to operate on each of the two rods 34. At the lower portion of the assemblage, a second group of rollers 46 is arranged such that two of these rollers each operate on the exterior edge of the gripper head 20, the purpose of the rollers being to generally maintain the alignment of this force delivery assemblage during the time when it is moving in the vertical directions. Thus, there is described above a test machine of the type to which the present invention is applied.

Machines of this type have the problem that during operation, either tension or compression, the gripping head 20, due to the operation of the primary force device, tends to move laterally or sideways compared to the main frame 16 and to the rest of the machine. This is normally due to the lack of exact axial alignment of the test piece in the gripping heads and/or to a tendency of the test piece to have a lateral component in addition to a longitudinal component as load is applied. In some instances, the test specimen may be of a construction which yields non-uniform strains during the testing of specimens which causes such lateral movement. Rams of the type, as illustrated in FIGURE 1, as compression ram 28 and tension ram 24, are closely fitted within their respective cylinders 30 and 26 with the clearance being in the order of one-thousandth of an inch. If the test specimen gripper head 20 is rigidly attached to the pressure actuating ram 24 or 28 and if the test specimens tend to cause the gripper head to move laterally, and since it is impractical to provide enough accuracy and rigidity to the guide rollers 46 to hold the gripping head 20 laterally within the normal clearance (.001") between ram 28 and cylinder 30, the lateral thrust on the ram 28 may tend to destroy the lubrication film and cause scoring of the walls of the cylinder. Even if such is not the case, the amount of pressure required within the cylinders 26 and 30 would be higher than would be necessary were this non-alignment not allowed and thus the efficiency of the machine could be greater.

To overcome these problems, the present invention provides a force transmitting connector, typically illustrated as 40 (FIGURE 4), which lies between the gripper head 20 and the force developing piston 28. This connector 40 consists of a plurality of rods 41 arranged in a circular pattern as a cylinder and having their ends integrally joined or connected, the one end being fixed in a hemispherically shaped end piece 40A, the lower ends being fastened in a generally cylindrically shaped disc 40B. Both of the end pieces 40A and 40B have recessed portions 44 and 46, respectively, for making the necessary connections within the testing machine.

The plurality of rods 41 provide a low value of rigidity in the lateral direction while still maintaining the load carrying capacity in the longitudinal direction. Thus, this overcomes the problem associated with the previously used solid rods which were too rigid and thus transmitted lateral thrust resulting from the almost unavoidable tendency for lateral movement and thus in turn tended to cause the piston seizure described above.

The hemispherical shape of the portion of the connectors that fits into the mating portion of the cylinder eliminates any tendency of canting due to lack of perfect parallelism of parts and allows the connector 40 to flex or move laterally while maintaining a constant area for force to be transmitted to the connector and thus tends to minimize the effects of misalignment of the primary force device with the test piece gripper head.

Although the tension cylinder 24 is illustrated with a connector 38 which is in a solid form, it is contemplated that such a connector may be of the type described hereinabove with respect to connector 40.

It should be apparent that changes may be made in details of construction without departing from the spirit of the invention except as defined in the appended claims.

I claim:
1. In a testing machine, the combination comprising a stationary cross head; parallel rods attached to said cross head for supporting a work-holding base; stationary means integral with said cross head; piston and cylinder devices within said stationary means; parallel rods on each side of said stationary means; work gripping means connected to the one ends of said last-mentioned rods, and another cross head connected to the opposite ends of said last-mentioned rods; a force transmitting means between one of said piston devices and said other cross head; and another force transmitting means between the other of said piston devices and said work gripping means, said last-mentioned force transmitting means comprising a plurality of parallel rods integrally joined to each other at their ends with one of said joined ends contacting said other pitson device and the other of said joined ends contacting said work gripping means.

2. In a testing machine, the combination comprising a stationary cross head; parallel rods attached to said cross head for supporting a work-holding base; stationary means integral with said cross head; piston and cylinder devices within said stationary means; parallel rods on each side of said stationary means; work gripping means connected to the one ends of said last-mentioned rods, and another cross head connected to the opposite ends of said last-mentioned rods; a force transmitting means between one of said piston devices and said other cross head; and another force transmitting means between the other of said piston devices and said work gripping means, said last-mentioned force transmitting means comprising a plurality of parallel rods integrally joined to each other at their ends with one of said joined ends having a hemispherical means mating with a corresponding means on said other piston device and the other of said joined ends contacting said work gripping means.

3. In a testing machine, the combination comprising a stationary cross head; stationary parallel rods attached to said cross head for supporting a work-holding base; stationary means integral with said cross head; aligned cylinders fixed to said stationary means; movable parallel rods on each side of said aligned cylinders; another cross head fixed to the one ends of said movable parallel rods; work gripping means connected to the other ends of said movable parallel rods; a piston within one of said cylinders acting on said other cross head to move said work gripping means in a direction to place a specimen held thereby in tension; and a force transmitting means between the other piston and said work gripping means for placing a specimen held thereby in compression, said force transmitting means comprising a plurality of parallel rods integrally joined to each other at their ends with one of said joined ends contacting said other piston and the other of said joined ends contacting said work gripping means.

4. In a testing machine, the combination comprising a stationary cross head; stationary parallel rods attached to said cross head for supporting a work-holding base; stationary means integral with said cross head; aligned cylinders fixed to said stationary means; movable parallel rods on each side of said aligned cylinders; another cross head fixed to the one ends of said movable parallel rods; work gripping means connected to the other ends of said movable parallel rods; a piston within one of said cylinders acting on said other cross head to move said work gripping means in a direction to place a specimen held thereby in tension; and a force transmitting means between the other piston and said work gripping means for placing a specimen held thereby in compression, said force transmitting means comprising a plurality of parallel rods integrally joined to each other at their ends with one of said joined ends having a hemispherical means mating with a corresponding means on said other piston and the other of said joined ends contacting said work gripping means.

References Cited by the Examiner
UNITED STATES PATENTS

| 1,998,722 | 4/1935 | Hveem | 73—94 |
| 2,187,345 | 1/1940 | Dinzl | 73—93 |
| 2,724,265 | 11/1955 | Kutsay | 73—103 X |

OTHER REFERENCES

German application, 1,115,055, 10/1961.

RICHARD C. QUEISSER, *Primary Examiner.*
DAVID SCHONBERG, *Examiner.*